Dec. 3, 1963  A. KRAUSE  3,112,728
TWIN SCREW POWER MOTOR BOAT AND TRANSMISSION CONTROL
Filed Oct. 2, 1961  2 Sheets-Sheet 1
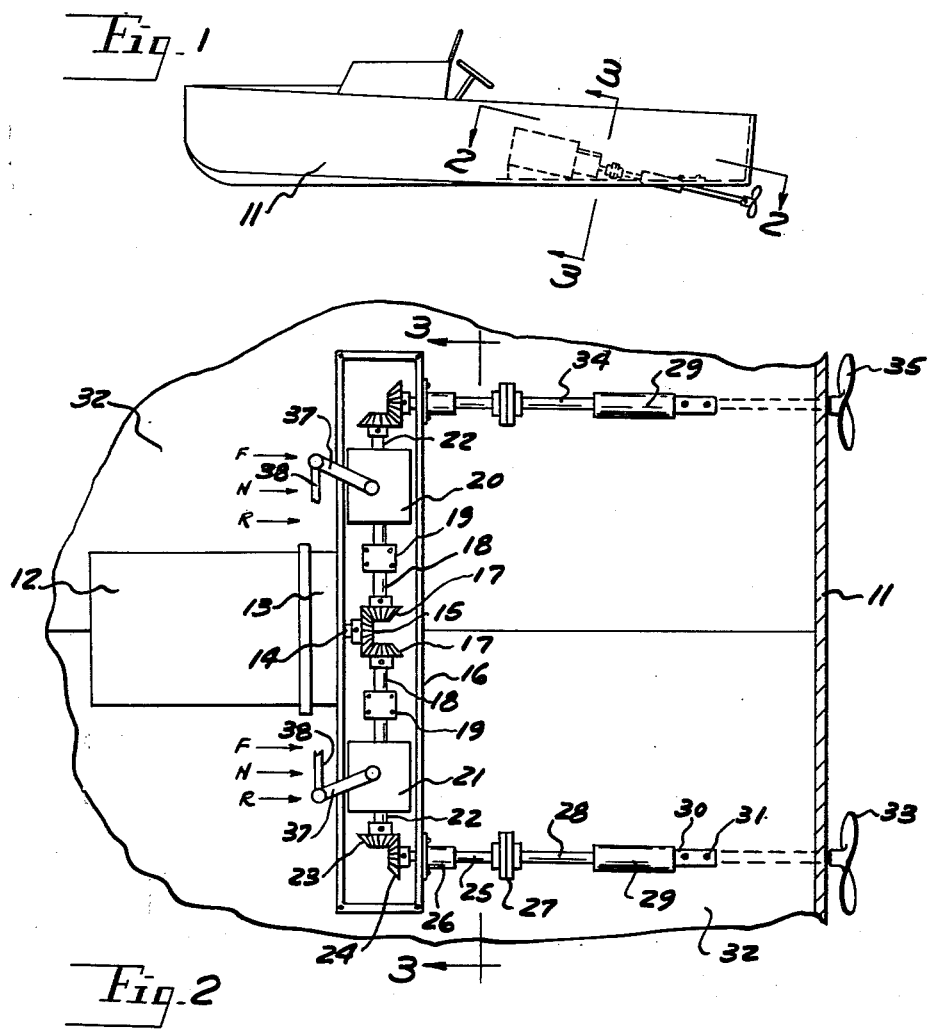
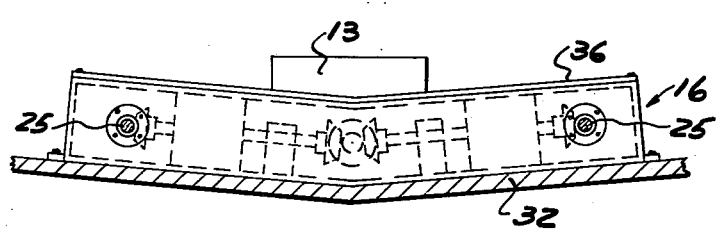
INVENTOR.
ALBERT KRAUSE
BY
Robert A. Sloman
ATTORNEY

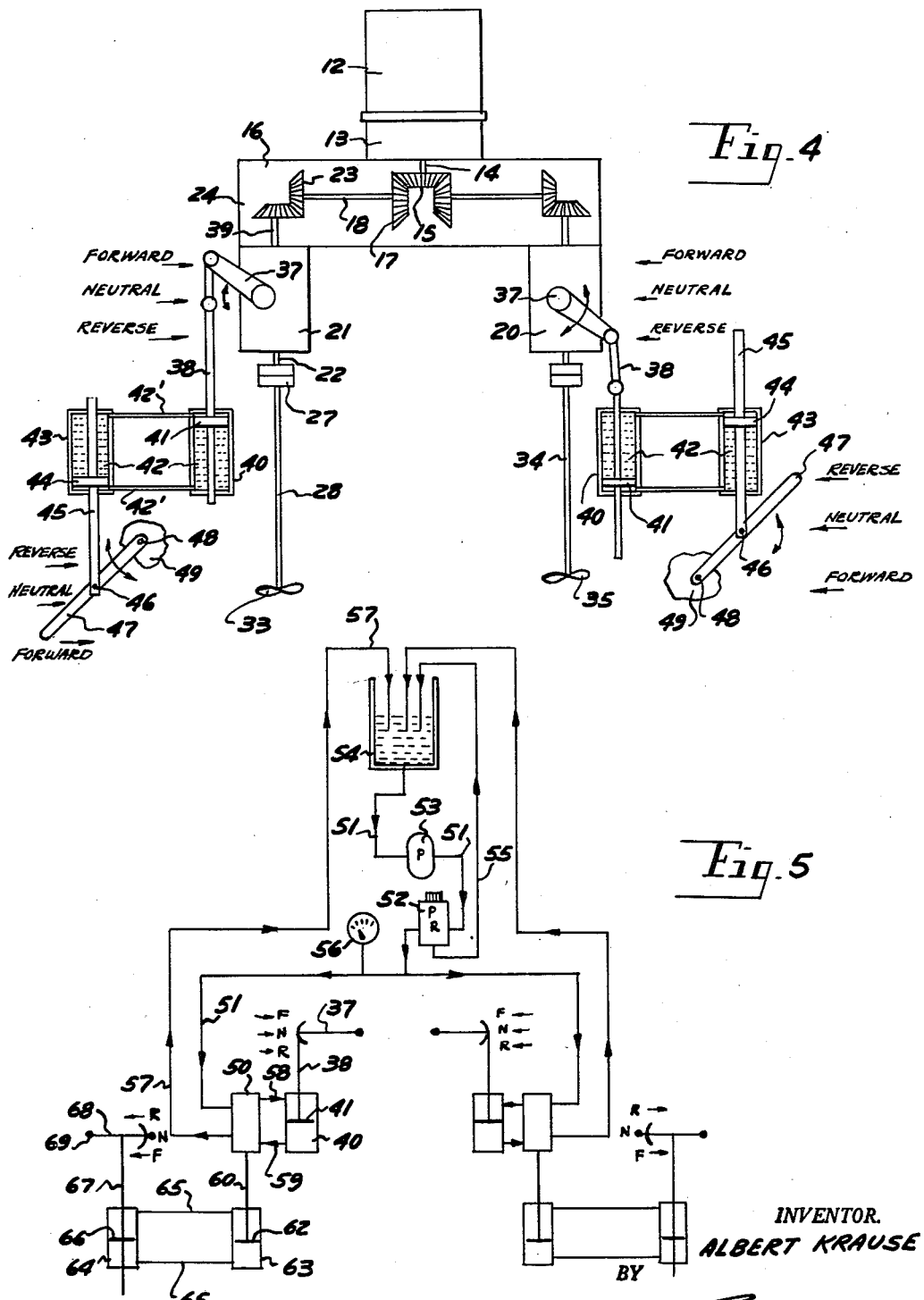

United States Patent Office 3,112,728
Patented Dec. 3, 1963

3,112,728
TWIN SCREW POWER MOTOR BOAT AND
TRANSMISSION CONTROL
Albert Krause, Royal Oak, Mich.
(21311 Groesbeck Highway, Warren, Mich.)
Filed Oct. 2, 1961, Ser. No. 144,002
1 Claim. (Cl. 115—37)

This invention relates to power boats, and more particularly to a power boat having a pair of parallel laterally spaced propeller shafts and a single engine for driving the same.

Heretofore in power boat operation, there have been provided, for example, a pair of motors with transmission means for each and with a separate propeller shaft connected to each motor. Also in connection with said transmissions, there were control means provided therefor by which the transmissions could be adjusted to either neutral, forward or reverse positions.

It is an object of the present invention to provide in a power boat construction having a hull, and a single engine, a pair of parallel laterally spaced propeller shafts which are journaled through the hull, and with separate control transmissions for each propeller shaft and with the transmissions themselves in turn connected to the driveshaft of the engine.

It is therefore a primary object of the present invention to provide in a power boat construction two or more propellers which are controlled by a single engine driveshaft, but wherein there is a separate transmission control means for each propeller shaft so that the propeller shafts themselves may be individually controlled.

Heretofore, it has been found in docking power boats, particularly of the twin propeller type, and in backing of the boat, the fact that with a single motor and a common transmission for the two propeller shafts requires that the same rotate in the same direction. Under many circumstances, it is desirable that the propellers rotate in opposite directions.

Heretofore, in a situation where a single motor is employed, this has not been possible, due to the fact that there has been a common transmission for controlling the two propellers.

It is a further object of the present invention to provide separate transmission control means for the individual propeller shafts of a single engine boat, which will not only save fuel, but provides for automatic synchronization of the propellers due to the one engine.

In case of damage to one propeller, it may be deenergized, due to its independent transmission control and the boat operated from a single propeller. This has other advantages also, when a low speed is desired, as in fishing or trolling.

It is another object of the present invention to provide a means by which the individual transmission controls for the corresponding propeller shafts may be manually operated, may be hydraulically operated by direct or remote control, or may be electrically operated under a solenoid control, or similar arrangement.

These and other objects will be seen from the following specification and claim in conjunction with the appended drawings, in which:

FIG. 1 is a side elevational view of a single engine power boat with multiple propeller shafts and with individual control transmissions for each.

FIG. 2 is a fragmentary section taken on line 2—2 of FIG. 1, but on an increased scale.

FIG. 3 is a fragmentary section taken on line 3—3 of FIG. 2.

FIG. 4 is a schematic diagram of the twin propeller shafts, the power means, the individual transmission controls and the hydraulic control mechanism for said transmissions.

FIG. 5 is another schematic view of another form of remote control for the individually operable transmissions.

It will be understood that the above drawings illustrate merely a preferred embodiment of the invention, and that other embodiments are contemplated within the scope of the claim hereinafter set forth.

Referring to the drawings, a power boat is shown in FIG. 1 as including hull 11, the schematic illustration of internal combustion engine 12, FIG. 2, the reduction gear assembly 13 and the driveshaft 14, which projects into the housing 16 and on the interior thereof carries the bevel gear 15 in mesh with a pair of spaced bevel gears 17 secured upon the ends of the respective input shafts 18, journaled at 19 within the said housing 16 and projected into the respective transmissions 20 and 21.

Each of the said transmissions has a separately operable output shaft 22 carrying a bevel gear 23 secured thereon in mesh with the bevel gears 24 respectively on the output shafts 25 which are journaled at 26 outwardly of the housing 16. Each of the housing output shafts 25 is respectively coupled as at 27 to the respective propeller shafts 28 and 34.

The said propeller shafts 28 and 34 are journaled through the bearings 29 which are mounted upon the said hull and extend through the bottom flooring 32 thereof, a portion of said bearing providing a securing plate 30 secured at 31 to the said flooring.

The said shafts 28 and 34 project outwardly of the hull and terminate in the respective propellers 33 and 35 at their outer ends for operation in the manner hereafter described.

Thus there has been shown in FIG. 2 in a diagrammatic manner a single internal combustion engine 12 for the power boat with the driveshaft 14, the pair of separably operable laterally spaced propeller shafts 28 and 34, and the separably operable transmissions 20 and 21 whose outputs are respectively connected to the respective propeller shafts, and whose input shafts are by suitable gear means connected with the driveshaft 14 of the engine.

As shown in FIG. 3, the flooring of the boat converges towards the center line, as indicated and the said housing 16, which is mounted upon the said flooring, is angularly shaped to conform with the said flooring and is suitably mounted and secured thereto. A removable cover is indicated at 36 for the said housing providing a means for access to the gear mechanism and the respective individually operable transmissions 20 and 21.

A separably operable control means is provided for each of the respective transmissions 20 and 21, which include the individual control arms, or lever arms 37, which at their inner ends are connected to the respective transmissions 20 and 21, and which are adapted for pivotal movements to one of the three positions indicated, as, for example, by the letter N for neutral, the letter F, meaning forward, and the letter R, meaning reverse.

The construction of the forward and reverse gear assembly for the individual transmission mechanism is conventional in nature and its detailed description is not illustrated or described. Suffice to say that the respective transmissions 20 and 21, each have power or input shafts 18, power output shafts 22 and a suitable control mechanism for switching the gearing within the said transmission under the control of the angularly adjustable control arms 37 to which some longitudinal reciprocal means, or linkage, or rod 38 is connected as fragmentarily shown in FIG. 2 for regulating the control positions of the respective arms 37.

It is contemplated, as a part of the invention, that the said transmissions 20 and 21 be separately and independently operable to their individual respective control positions, and that various remotely operated means may be employed for effecting control positions of the members 37.

Several illustrative means for accomplishing the result of causing the tilting movements of the control arms 37 are shown in the drawings with respect to FIGS. 4 and 5.

Referring to FIG. 4, which is a schematic drawing, the general arrangement above described is repeated in the sense that there is a single internal combustion engine or motor 12, the speed reducer 13 and the output shaft 14 and connected thereto the bevel gears 15 and 17, which through intermediate gearing 23—24 connect the input shafts 39 respectively of the two separately operable power transmissions 20 and 21.

The only difference actually between the illustration shown in FIG. 2 and FIG. 4 is that in FIG. 2, the separately operable transmissions 20 and 21 are within a common housing 16 and their output shafts 22 through intermediate gearing 23—24 connect the output shafts 25 from the said housing 16 and in turn coupled to the respective propeller shafts 28 and 34.

In the illustration shown in FIG. 4, arrangement is a little different in the sense that gear means above mentioned, namely the gearing 15, 17, shafts 18, and the further gears 23 and 24 are within the housing 16, but the transmissions 20 and 21 respectively are upon the exterior thereof but with their respective input shafts 39 extending into the said housing and connected into the gearing arrangement.

The operating is exactly the same, however, in the sense that gear means are employed for transmitting rotative power from the driveshaft 14 of the engine to the individual separable operable transmissions 20 and 21, which actually is the important factor in the present invention.

Again, as above described in connection with FIG. 2, the individual transmissions 20 and 21 of FIG. 4 have control arms or levers 37, which are movable into one of three individual positions identified in the drawing, as "forward," "neutral" and "reverse" for the individual control of the respective propeller shafts 28 and 34 and the connected propellers 33 and 35 respectively.

An illustrative form of remote control for the individual transmission, is shown in FIG. 4, wherein there is provided an actuator cylinder 40 having a reciprocal piston 41 connected to the piston rod 38, which extends through the said actuator cylinder and is connected at its outer end to the outer end of the control arm 37 of the transmission, said actuator cylinder containing a fluid 42, filling the same.

A control cylinder 43 is provided for the said actuator, being the same size as said cylinder 40, which also has reciprocal piston 44 on the shaft 45, which extends through the said cylinder 43, there being individual respective conduits 42 which interconnect the respective ends of the cylinders 40 and 43 to provide a closed circuit therebetween and wherein the hydraulic fluid 42 also fills the cylinder 43.

A manual control arm 47 is provided pivotally mounted at 48 to some portion of the boat, as at 49, FIG. 4, and intermediate its ends is pivotally connected as at 46 to the reciprocal piston rod 45.

Three positions of adjustment are indicated as "reverse," "neutral" and "forward" with respect to the said control arm 47 and which correspond to control movements of the piston 44 within control cylinder 43.

In view of the closed circuit between the two cylinders 40 and 43, it is seen that longitudinal movement of the piston 44 will effect a simultaneous longitudinal movement of piston 41 to the exact same extent. Accordingly, it is seen that with the control arm 47 in the forward position of adjustment, the control lever 37, through the action of the piston rod 38 is in its "forward" control position.

The same construction, without repetition is provided with respect to the transmission 20, FIG. 4, and its detailed mechanism is not repeated. Suffice to say that there is the second control arm 47, which has three positions of adjustment for effecting corresponding positions of adjustment of the lever 37 of the said transmission 20.

This is a manual control for the actuators 40 and it is contemplated of course, that the said manual control may be adjacent the said transmission 21 or may be remote therefrom, as in the wheel house of the boat, or other forward locations. As shown in FIG. 4 of the drawing, the transmission 21 is connected to the said actuator 40, controlling the port propeller 33, whereas the second actuator 40 for the transmission 20 controls the starboard propeller 35. This provides a means by which the operator of the boat may so control the individual transmissions 20 and 21 that the said propellers 33 and 35 will rotate in the same or opposite directions as desired.

It is contemplated also that boat propellers may be maintained in a "neutral" position or one may be left in "neutral" position, and the other either in forward or reverse, as desired.

Referring to FIG. 5, there is shown still one other form of remote control for the respective actuators 40 which effect reciprocal movements of the piston rods 38 and corresponding angular adjustment of the control arms 37 of the respective transmission.

In FIG. 5 in each case is under the control of a four-way, self-centering valve 50 which receives pressure fluid from conduit 51 connected to the hydraulic sump 54, which stores a body of fluid such as oil. Interposed in the fluid line 51 is a suitable cam operated pump 53 for creating a pressure condition, as desired for said fluid, and there also being interposed in the fluid line the pressure regulator 52 connecting the fluid line 51 and including the fluid return conduit 55, which goes back to the hydraulic sump 54, as schematically shown.

A suitable pressure gauge 56 is interposed as indicated in FIG. 5 to give an indication of the pressure at any time, that is maintained to the two four-way self-centering valves 50. Conduit 57 is also connected between the respective control valves 50 and the sump 54 for the return of fluid exhausted from one end or the other of the actuator cylinder 40, on reciprocal movement of the piston 41 therein.

Valve 50 has a pair of outlet ports 58—59, one of which will be a pressure port and the other an exhaust port, depending upon the adjustment of the valve element within the valve 40.

For example, with the valve in one position of adjustment, fluid under pressure will pass through conduit 58 to the forward end of actuator cylinder 40, moving the piston 41 rearwardly with the exhaust on the opposite side of said piston returning to conduit 59 to the valve body 50 and through the exhaust conduit 57 back to the hydraulic unit.

Accordingly, the remote control mechanism thus comes down to a control for the valve 50, and more particularly the movable valve element therein, the said valve 50 being a self centering type of valve, the detail of which construction is believed not necessary to a full disclosure of the present invention, and according further reference thereto is omitted, except to the extent that the operation hereinabove has been described.

For the individual and separate control of the actuator cylinders 40, and the associated valves 50, there is provided the respective port and starboard control pilot cylinders 63, FIG. 5.

Each of these cylinders includes a reciprocal piston 62 and connected piston rod 60 extending therefrom which is directly connected to the movable element of the four-way valve 50.

In connection with the pilot cylinders 63, there is a corresponding control cylinder 64, which is preferably of the same size as the cylinder 63, and is connected thereto at its respective ends through the conduits 65 in a closed circuit relationship. Control cylinder 64 has a manually reciprocal piston 66, which through rod 67 is connected to the reverse lever corresponding to the particular control cylinder 64 has three positions of adjustment on the dashboard, or other part of the boat proper, such as indicated by the letters R and N, and F.

Accordingly, when the reverse gear lever 68 is moved manually to one of the three indicated positions shown in FIG. 5, there will be a corresponding movement of the pilot control cylinder piston 62, the valve element within the valve, and a corresponding movement of rod 38 from actuator 40 for directly moving the transmission control arm 37 to the corresponding one of three positions indicated by the letters F, N, R. Thus there is disclosed herein the hydraulic means of remote control for the individually or separately operable transmission mechanisms which regulate the direction of rotation of the particular propeller shaft 28 or 34 respectively.

It is recognized that pushbutton control could be substituted for the reverse gear lever 68 by employing double acting spring return solenoids therefor, if desired and for achieving the same results as above described.

Accordingly, the primary object of the present invention is achieved, namely the single motor drive for a pair of propeller shafts, but with independent transmission controls in the gear connections to the respective propeller shafts by which they may be independently operated or operated in different directions.

It is contemplated that various types of manual or remote control means may be employed for effecting the operation of the independent transmissions 20 and 21 by which the operation and direction of operation of the respective propeller shafts may be controlled selectively and independently of each other, but nevertheless using the power from a single engine.

It is also contemplated, of course, that the propellers 33 and 35 may be pitched at any angle desired to achieve the desired results. While a pair of propeller shafts have been employed, it is possible, as a part of the present invention to provide for third and fourth propeller shafts, if desired, all taking power off the main power source, and with separate transmission controls for each propeller shaft, in accordance wtih the invention, as above described.

Having described my invention, reference should now be had to the following claim.

I claim:

In a power boat, a hull, an engine therein having a driveshaft, a pair of parallel laterally spaced propeller shafts journaled through the hull, a pair of separately operable transmissions, each having an output shaft coupled to a propeller shaft respectively, an input shaft for each transmission connected to said engine driveshaft, and a separately operable control means for each transmission adapted for selective adjustment for forward, neutral and reverse positions, the control means for each transmission including a lever arm pivotally joined at one end to the transmission, and an actuator having a longitudinally reciprocal rod joined to the other end of said arm, said actuator including a cylinder and reciprocal piston joined to said rod, valve means connected to a source of pressure fluid and having a pair of outlets connected to respective opposite ends of said actuator cylinder, and a remote controlled manually operated means connected to said valve, said remote controlled manually operable means including a pilot cylinder having a reciprocal piston rod connected to said valve, a remotely located control cylinder including a piston and rod, conduits interconnecting the respective ends of said control cylinder and pilot cylinder in a closed circuit, and a manually operated control means connected to said control cylinder and adjustable into forward, neutral and reverse positions for effecting corresponding movements of said transmission control means.

References Cited in the file of this patent

UNITED STATES PATENTS

| | | |
|---|---|---|
| 779,806 | Schmucker | Jan. 10, 1905 |
| 1,013,982 | Benyo | Jan. 9, 1912 |
| 2,315,270 | Palmer | Mar. 30, 1943 |
| 2,386,362 | Soldner | Oct. 9, 1945 |
| 2,642,972 | Brooks | June 23, 1953 |
| 2,936,730 | Patty | May 17, 1960 |
| 2,999,476 | Johnson | Sept. 12, 1961 |

OTHER REFERENCES

Ser. No. 272,652, Egersdorfer (A.P.C.), published Apr. 27, 1943.